(12) United States Patent
Zhang (10) Patent No.: US 7,401,249 B2
(45) Date of Patent: Jul. 15, 2008

(54) METHOD FOR BACKING UP AND RECOVERING DATA IN A HARD DISK

(75) Inventor: Jianhui Zhang, Beijing (CN)

(73) Assignees: Legend (Beijing) Limited, Beijing (CN); Quantum Designs (H.K.) Limited, Hong Kong (CN)

( * ) Notice: Subject to any disclaimer, the term of this patent is extended or adjusted under 35 U.S.C. 154(b) by 531 days.

(21) Appl. No.: 10/495,393

(22) PCT Filed: Mar. 12, 2002

(86) PCT No.: PCT/CN02/00145

§ 371 (c)(1),
(2), (4) Date: Nov. 3, 2004

(87) PCT Pub. No.: WO03/042840

PCT Pub. Date: May 22, 2003

(65) Prior Publication Data

US 2005/0081004 A1    Apr. 14, 2005

(30) Foreign Application Priority Data

Nov. 12, 2001   (CN)   ................................. 01 1 34778

(51) Int. Cl.
*G06F 11/00*   (2006.01)

(52) U.S. Cl. .......................................................... 714/5
(58) Field of Classification Search ..................... 714/5, 714/6, 13, 15, 16, 42
See application file for complete search history.

(56) References Cited

U.S. PATENT DOCUMENTS

| | | | | |
|---|---|---|---|---|
| 5,537,588 A * | 7/1996 | Engelmann et al. | .......... | 707/202 |
| 5,924,102 A * | 7/1999 | Perks | .......... | 707/200 |
| 5,956,745 A * | 9/1999 | Bradford et al. | .......... | 711/137 |
| 6,047,294 A * | 4/2000 | Deshayes et al. | .......... | 707/204 |
| 6,185,666 B1 * | 2/2001 | Murray et al. | .......... | 711/173 |
| 6,505,216 B1 * | 1/2003 | Schutzman et al. | .......... | 707/204 |
| 7,035,850 B2 * | 4/2006 | Arai et al. | .......... | 707/6 |
| 2002/0069363 A1 * | 6/2002 | Winburn | .......... | 713/200 |

* cited by examiner

*Primary Examiner*—Nadeem Iqbal
(74) *Attorney, Agent, or Firm*—Jenner & Block, LLP (57) ABSTRACT

A method for backing up and recovering data in a hard disk, used to back up data in the hard disk, including the following steps: partitioning a segment in the hard disk as a data backup area; backing up the partition status and at least one partition data needed to be backed to the data backup area; and locking the data backup area to forbid other application software or operation system to access it. The present invention can backup and recover the data in the hard disk safely and reliably and also can ensure the safety of the backup data.

20 Claims, 12 Drawing Sheets

METHOD FOR BACKING UP AND RECOVERING DATA IN A HARD DISK

CROSS REFERENCE TO RELATED APPLICATIONS

This application is the U.S. National Patent Application corresponding to PCT Patent Application No. PCT/CN02/00145 filed on Mar. 12, 2002, which claims priority from Chinese Patent Application No. 01134778.3 filed on Nov. 12, 2001.

TECHNICAL FIELD

The present invention relates to a method for backing up and recovering data in a hard disk of a computer.

BACKGROUND ART

As the most common external storage device, a hard disk is used for storing information of operation systems and a great amount of data, thus its safety and reliability is of great importance. But all the misoperation of users, the defects in hard disk data management software, and the attack of computer viruses may destroy the useful data in the hard disk. So backup of the hard disk data is very important to ensure that some critical data contents can be recovered when necessary.

One of the existing hard disk data backing up methods is to back up the information of a partition or a hard disk as a file, and to open the file during recovery to recover the backed contents into the original partition or hard disk. This backing up method is based on a file system, and once that file system is damaged, the partition where the backed file is stored is deleted due to the attack of viruses, or the partition is damaged so that the file can not be read out any more, then the backed information would be impossible to be recovered. Since such a backup depends on the integrality of the partition where the backed file is stored and the integrality of the backed file itself, the safety of this kind of backup is not guaranteed.

In the existing hard disk data backing up methods, both the backing up and the recovery have some limitations, i.e., either the whole hard disk or a partition is backed up, and the recovery can only be done according to the mode which is taken during the backup. But if a user has different requirements, for example, sometimes the user wants to recover the whole hard disk, while sometimes the user just wants to recover one partition. However, the backup mode for a whole hard disk would not allow the recovery of only one partition thereof, and the backup mode for a partition would not allow the recovery of the whole hard disk. Thus, if both partition and whole hard disk recovering capabilities are required, two backups are needed: one in partition mode, another in whole hard disk mode, which will result in redundance of backup operation, and produce not only waste of human power and time, but also waste of the space in the hard disk.

SUMMARY OF THE INVENTION

The object of the present invention is to provide a method for backing up and recovering computer hard disk data safely and reliably. Computer users can use the invention to back up the data in the hard disk very conveniently and are able to recover quickly the hard disk data damaged by various factors, thus the data safety can be improved.

The technical scheme of the present invention is as follows:

A method for backing up user data in a hard disk according to the present invention, comprises the following steps:

(1) Partitioning at last a segment of hard disk space from the hard disk as a data backing up area;
(2) Backing up a partition status of the hard disk and data to be backed of at least one partition into the data backing up area;
(3) Locking the data backing up area to prohibit other application software or operation systems from accessing the data backing up area.

In the data backing up method of the invention, said data backing up area may be an area space at a higher end of the logic addresses of the hard disk. However, the present invention is not limited to this, generally speaking, the data backing up area of the invention may be placed at any area of the hard disk. But since the Host Protected Area Feature supported by IDE hard disk standards (e. g. ATA5 and following IDE hard disk norms) can only protect the higher end areas, the data backing up area is preferably set at the higher end area. The data backing up area may be either one segment or several segments in the hard disk.

In the data backing up method according to the invention, said locking of the data backing up area and setting of the data backing up area may be implemented by setting the highest address of the hard disk, which may be done automatically, and the highest address is lower than the practical highest address of the hard disk space. Once the highest address has been set up successfully, the sectors in the hard disk which have addresses in between the set highest address and the practical highest space address will not be able to be accessed any more. In locking status, it is impossible for any software to access or amend the contents in the locked area, special commands are needed to load or unload the protection to this area, and thus the safety and reliability of the backed data are ensured. Other locking means may also be used to forbid any access to the data backing up area.

For setting up the highest address of the hard disk, the SET MAX command supported by the hard disk area protection function of the hard disk itself may be used to partition off a higher end area of the hard disk with addresses higher than the highest address, as a data backing up area; hard disk areas with addresses lower than the highest address are used as data areas which the user may use.

In the data backing up method according to the invention, the size of the data backing up area may be determined based on the space size on the hard disk that is practically occupied by the data information. The size of the data backing up area may be larger than that of the space practically occupied by the data. In fact, the present invention only backs up the data, which actually occupy some space, and does not back up any spare space. Thus the least required size for the backing up area can be calculated and the data backing up area with corresponding size may be partitioned off from the hard disk.

During the data backup, the hard disk data may be written into the data backing up area together with some controlling information, the controlling information may comprise the information of: size of the backing up area, starting address of the backing up area, size of the original partition of the backup; number of original partitions, type of the partitions, size of the hard disk partition table, and a mark showing whether the backing up area has been locked successfully. These controlling information are the grounds for the data recovery and locking.

In the data backing up method according to the invention, there may be two different manners for locking the data backing up area as follows:

(1) Permanent locking: when locked, the data backing up area locked at higher end can not be accessed, even when the hard disk is re-started after power down, the locked data backing up area can still not be accessed;

(2) Provisional locking: when locked, the data backing up area locked at higher end can not be accessed, but when the hard disk is re-started after power down, the locking status will has a status value of the latest set permanent locking.

The two said locking manners may correspond respectively to two setting manners of SET MAX commands, namely, permanent setting manner and provisional setting manner.

In the data backing up method according to the invention, during the data backup, a mark showing the locking status may be stored in the data backing up area, and this mark may be set to a mark to be locked or a successfully locked mark, indicating accomplished provisional locking and permanent locking respectively.

When the hard disk is started, if the said mark is the mark to be locked, then a permanent locking operation can be performed to the hard disk, and when this operation is successful, the mark may be set as a successfully locked mark.

In the data backing up method according to the invention, said backing up the data into the data backing up area may comprise the following steps:

(1) Reading out a main bootstrap record of the hard disk;
(2) Finding out information on various partitions according to a hard disk partition information table in the main bootstrap record;
(3) Calculating a data volume in each partition according to a FAT (FILE Allocation Table) of each partition, calculating a volume required for backing up each partition, and partitioning off a data backing up area from a spare higher end space in the hard disk;
(4) Storing the FATs in various partitions and the bootstrap record sectors into the data backing up area;
(5) For each section, storing used clusters in the data area of the partition into the data backing up area according to an occupation status of the FAT.

The present invention provides a hard disk data recovering method for recovering data backed and locked in the hard disk from a data backing up area to a partition that is operation system based accessible, comprising:

(1) Unlocking the data backing up area;
(2) Recovering data in the data backing up area to their corresponding hard disk partitions according to the controlling information stored in the data backing up area, this step includes the following steps that may be selected by the user to be performed:
(a) A step of recovering a single hard disk partition, which recovers the data of a certain partition of the hard disk contents backed in the data backing up area;
(b) A step of recovering the whole hard disk, which recovers the partition status of the hard disk back to that during backup, and recovers the data information in the data backing up area to each corresponding hard disk partition, i. e., recovers all the data in each hard disk partition to their original status during backup.

In the data recovering method according to the invention, said locking of the data backing up area may be accomplished by setting the highest address of the hard disk that is lower that the practical highest space address of the hard disk; said unlocking step may be accomplished by setting the practical highest space address as the highest address so that the data backing up area can be accessed.

In the data recovering method according to the invention, the step of recovering a single hard disk partition may include:

Starting from a root catalogue, reading out sequentially the data in the data backing up area in file manner, re-dividing the backup of every file into several clusters according to the cluster size of the current partition, re-constituting a cluster chain for every file and storing the chain into the current partition; and modifying the file information in the catalogue such that it will point at a correct head cluster in the recovered partition; for sub-catalogues, in addition to reconstituting cluster chains for the catalogue itself and storing them into the partition, further re-constituting cluster chains for various files in the catalogue and sub-catalogues and storing them into the partition. This manner is a method for recovering a single partition based on file occupation manner.

In the data recovering method according to the invention, the step of recovering a single hard disk partition may include:

When both the structures and the number of sectors of each cluster in the partition to be recovered and the partition during backup are the same, recovering the clusters used in the partition into the partition according to the FAT during backup, recovering the cluster occupation status in the backed FAT into the FAT of the partition, and filling empty cluster marks with information on other unused clusters in the partition FAT. This manner is a method for recovering a single partition based on FAT occupation manner.

In an embodiment of the data recovering method according to the invention, the hard disk partition status stored in the data backing up area is read out first, and the current hard disk partition status is set to the status during backup, then for each partition, the contents of each partition in the backing up area are recovered to a corresponding position of the partition according to the FAT occupation status during backup, and thus the recovery of data in the whole hard disk is accomplished.

In an embodiment of the data recovering method according to the invention, computer programs for controlling the execution of said steps of hard disk data backing up method and data recovering method are incorporated in a system BIOS (Basic Input Output System) program in the computer, the programs will be executed when the computer is started.

A hot key (backup hot key) used to start the procedure of hard disk data backing up and a hot key (recovery hot key) used to start the procedure of hard disk data recovering may be set on the computer keyboard. When a user presses the backup hot key or the recovery hot key, the computer will perform the procedure of data backing up or data recovering.

The method of the present invention can back up and recover the data in a hard disk safely and reliably. A computer user can back up hard disk data very conveniently by using the present invention, and quickly recover damaged or lost hard disk data caused by various factors, except severe physical, mechanical damages or the damaged memory medium. The present invention may use the ATA5 hard disk norm supported functions of locking and controlling higher end areas, to back up the hard disk data to a protected area in the hard disk space higher end. Since that area depends neither on the hard disk partitioning nor on the operation system, thus can not be accessed by any application software or operation systems, and will not be invaded even when the whole hard disk is attacked by computer viruses, so that the backed hard disk data will not be damaged, and the safety of backed data is ensured.

By the use of hard disk locking function and locking marks, the invention can ensure that the data backing up area at the higher end address of the hard disk will not be accessed and damaged during computer starting, in the meantime, the problems of probable failure of single time locking and copying of master disk during mass production are resolved. After a master disk is produced, the hard disk has been provisionally locked and data in the data backing up area is at a protected status, the safety of the data backing up area is ensured. While since the hard disk has not been permanently locked, it can be taken out and then regular hard disk copying can be performed, and the hard disk is copied in batches. When the hard disk is re-started, it will be permanently locked, at this time, the data backing up area will be in a protected status, and can not be accessed even when the hard disk is moved to another system. Thus, the method for locking hard disk data backing up area according to the present invention both ensures the safety of data and considers sufficiently the demands of system manufacturers who need to massively copy and produce hard disks with backed data contents, so that the contradiction between mass production and data safety is resolved.

The computer program for realizing the present invention may be integrated with a computer system BIOS, and is stable and reliable, so the recovering and backing up algorithms themselves are very safe. With storing and locking the backed data in higher end addresses of hard disk, the safety of those data is ensured.

The invention can either back up data of one hard disk partition each time, or back up data of the whole hard disk each time. After backup, a user may perform various recovering functions versatilely, for example, when the whole hard disk has been locked, a user can recover only one partition by directly using the backed data, and does not have to back up that single partition separately just for recovering it, thus the hard disk space is saved and multiple functions are provided.

The methods of present invention for backing up hard disk data and locking the data backing up area have many remarkable advantages. For instance, the following cases may happen during user's applications:

(1) Under some circumstances, for example, the data of whole hard disk are lost due to the attack of computer viruses or mis-deletion of some critical files; with the recovering method of the present invention, it is possible to recover all partitions and data of the hard disk back to their statuses during backup.

(2) Under some circumstances, the system partitions are totally formatted due to the attack of viruses, mis-deletion of critical files, or mis-operation, a part of or all files are lost, the system can not be started normally; with the methods of present invention the system portion of backed data can be totally recovered, and the system can be started normally, while the contents in hard disk data area are not impacted.

(3) When a user re-defines the partitions of a hard disk, the sizes of both the hard disk system partitions and data partitions are changed, then the operation system can be copied into a new partition in accordance of the backup manner by using the recovering method of the present invention, thus the time for installing the operation system is saved, and the cost for additional recovery disk are saved too.

(4) When a user re-defines the partitions of a hard disk, the sizes of both the hard disk system partitions and data partitions are changed, and the user installs a new operation system in new system partitions and a great amount of data is stored in other partitions. If the user wants to recover the original operation system, he or she may recover the system partition by using the single partition recovering function of the present invention without impacting the contents in other partitions.

(5) When a user moves the hard disk into another computer system, re-defines the partitions and formats the hard disk, since the contents in backing up area has been locked, the locked concealed area is invisible on that computer system, but the data therein is still well hold. When the user moves the hard disk back to the original computer, he or she can recover the original content on the hard disk by pressing a hot key to start the method of the present invention.

(6) Computer manufacturers may use the methods of present the invention to back up the contents of hard disk system during manufacturing, and copy a lot of hard disks of the same kind with the backed hard disk, and then lock them by using the methods of the present invention. When a user has bought a computer, the system may be damaged and not be able to be started normally due to various reasons, then the user can conveniently recover the status of the hard disk to its original status as before leaving factory by using the recovering function of the invention; he or she may also recover the operation system to its original status as before leaving the factory, by recovering only the system partitions, without impacting the sizes and contents of other partitions.

The present invention will be further described in conjunction with accompanying drawings and embodiments.

DETAILED DESCRIPTION OF PREFERRED EMBODIMENTS

Figure 1:
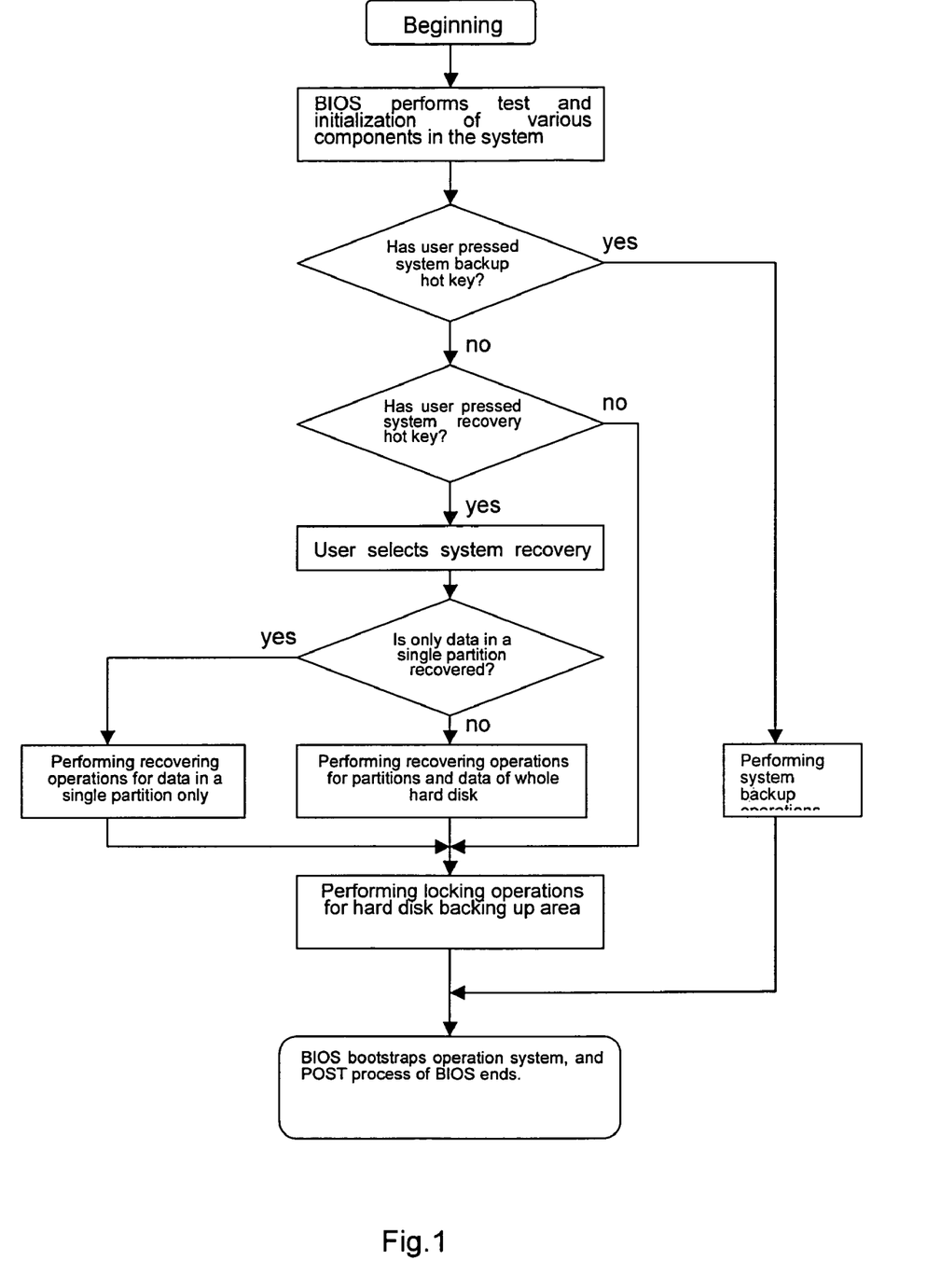
FIG. 1 is a flow chart showing a BIOS system program in an embodiment according to the invention.

In an embodiment of the invention, as shown in FIG. 1, a program that controls a computer to perform the data backing up and recovering of the invention is stored in a FLASH ROM chip of BIOS, and the IDE hard disk data backing up and recovering are performed during the running of BIOS. A user may press the backup hot key to enter a backup function menu, or press a recovery hot key to enter a recovery function menu. The backing up of the partition information and the data in partitions of the whole hard disk may be implemented by the backup function menu, and the recovering of backed data information to the hard disk according to user's wishes may be implemented by the recovery function menu.

In the POST (Power On Sell Test) process of BIOS, as shown in FIG. 1, if the system recovery hot key or the system backup hot key is pressed by a user, then BIOS will set a corresponding mark, and BIOS will check the set mark after the test and initialization of various system hardware have been accomplished and before the operation system is started. If none of the hot keys is pressed, then BIOS will perform a series of operations for locking the hard disk backing up area; if the hard disk backup hot key has been pressed by the user, the BIOS will perform a series of operations for hard disk backing up; while if the hard disk recovery hot key has been pressed, the BIOS will perform a series of operations for hard disk data recovering, and after the hard disk recovering operations have been accomplished, BIOS will perform a series of operations for locking the hard disk backing up area. After locking hard disk, the operation system will be started, and then the POST process of BIOS ends.

The present invention is especially suitable for IDE hard disks, which are in conformity with the ATA5 and sequent norms, the data backing up area is locked by using their unique SET MAX command. When locked, contents in the locked area are impossibly accessed or modified by any software, thus the safety and reliability of the backed data are ensured. The method of the invention for locking a hard disk data backing up area not only ensures the data safety, but also totally satisfies the demands of system manufactures that need to massively produce and copy hard disks with backed data contents on them.

Figure 2:
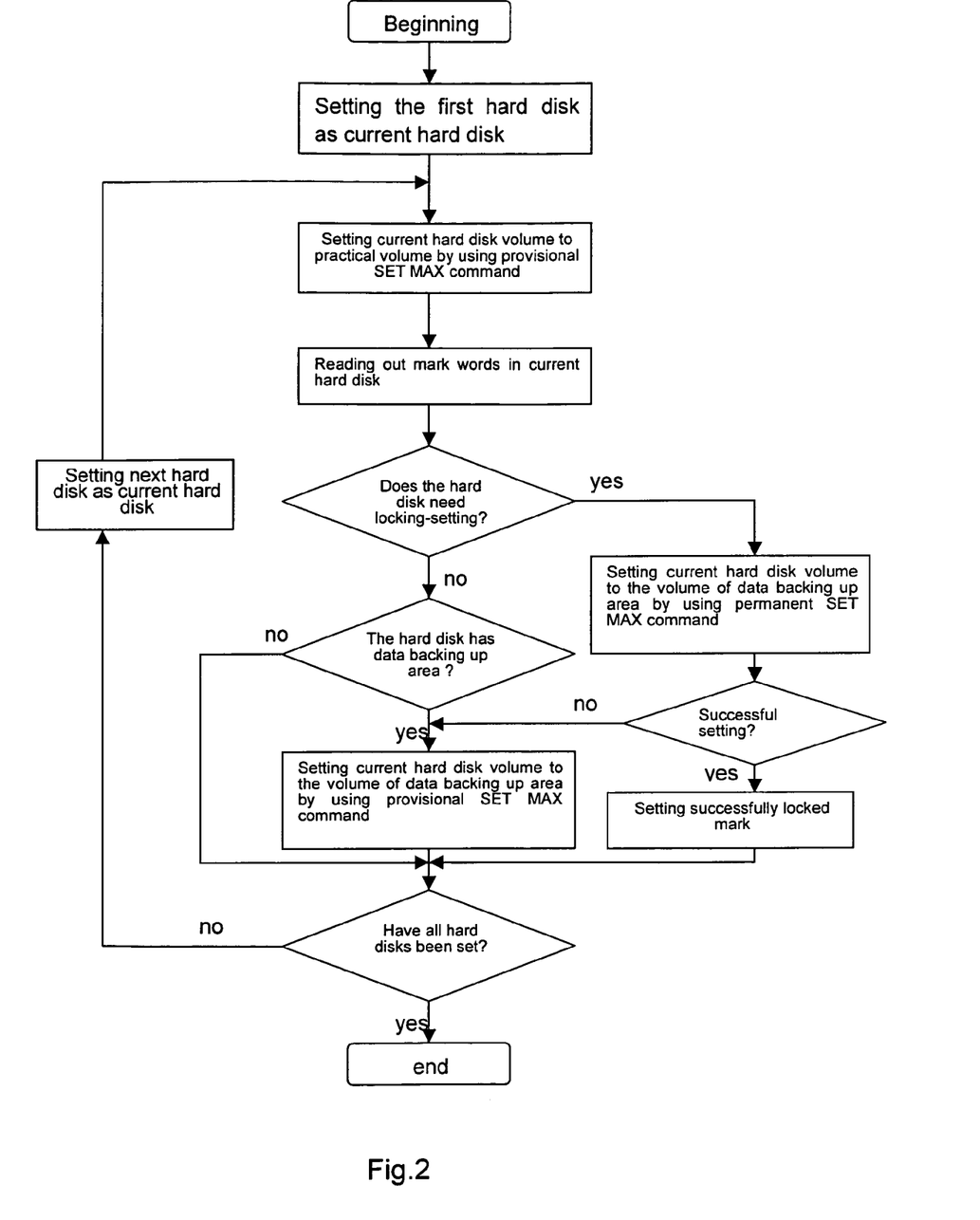
FIG. 2 is a flow chart showing the locking of a hard disk data backing up area in an embodiment according to the invention.

FIG. 2 shows a method for locking data backing up area in an embodiment according to the present invention. In the embodiment, the method for locking a higher end area of the hard disk is accomplished by using SET MAX command in accordance with ATA 5 norm. The function of the command is to set the highest address of hard disk. When the setting is successful, all hard disk sectors with addresses higher than the set address are forbidden to be accessed. This is the manner that said command realizes the locking of hard disk higher end area. The manners of locking the higher end areas comprise permanent locking and provisional locking. The two locking manners have same locking effects on hard disk accessing control, except their locking durations are different. The provisional locking is valid only when the power is on, and may be set for many times; while the permanent locking will keep valid even after power is down. But the setting of permanent locking can only be performed once within one power-on period of the hard disk, and a second time setting of permanent locking would be invalid. Since system manufactures massively produce the hard disks by the use of a hard disk copying machine, and the copying machine will access the hard disk space by means of software; if the locking function has been set during production, the data backing up area at higher end could not be copied effectively.

Therefore, the following method is used in the embodiment:

For facilitating production, the hard disk only is provisionally locked during backing up the hard disk. During that backing up processing, a mark "to be locked" is stored in the backing up area, the meaning of that mark is that the data on the hard disk has been backed up, but the data backing up area has not been permanently locked yet. The provisional locking can not only ensure the data safety within the current power-on period, but also make it possible that the system manufacturer turn down the power and take out the hard disk after backup, then load it to a hard disk copying machine to perform complete hard disk copying. Then, although the hard disk has been provisionally locked, the locking will become invalid after power down, so that the software of the hard disk copying machine can access the data backing up area.

Later when the computer system is started, the system BIOS will check the mark, if it is a mark to be locked, then the hard disk will be permanently locked, and if the locking is successful, then the mark will be re-set to "successfully locked" status; if the permanent locking operation is unsuccessful, then the mark will not be changed and the hard disk will be provisionally locked, and the permanent locking operation will be performed again during next start, until the higher end is successfully locked. The setting of provisional locking performed after an unsuccessful permanent locking operation ensures the data safety within current power-on period. And the providing of a locking mark allows the computer to perform a locking operation each time it is started, until a locking operation is successful.

As shown in FIG. 2□ when locking operation for a data backing up area is performed, the following operations are performed for each hard disk without any participation of user:

Setting a hard disk volume as the practical volume of the hard disk by using the provisional SET MAX command, then reading out the controlling information in the hard disk, if the mark in the controlling information shows that the hard disk is at a state "to be locked", then performing a permanent locking operation to the hard disk data backing up area; when the operation is successful, setting the mark as "a successfully locked mark"; when the operation is unsuccessful, then performing a locking operation to the data backing up area by using the provisional SET MAX command.

Figure 3A:
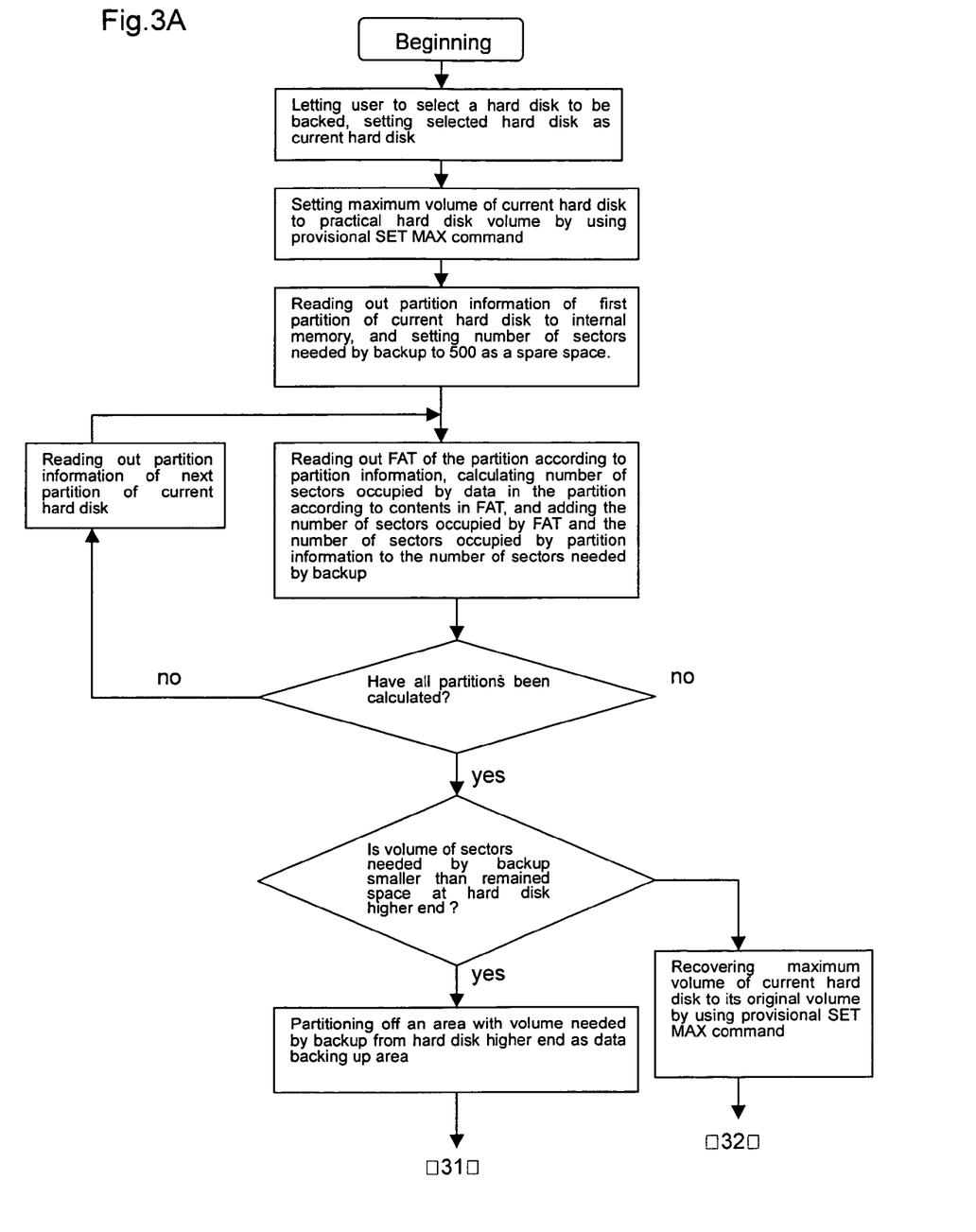
FIGS. 3A and 3B show a flow chart of the hard disk data backing up in an embodiment according to the invention.
Figure 3B:
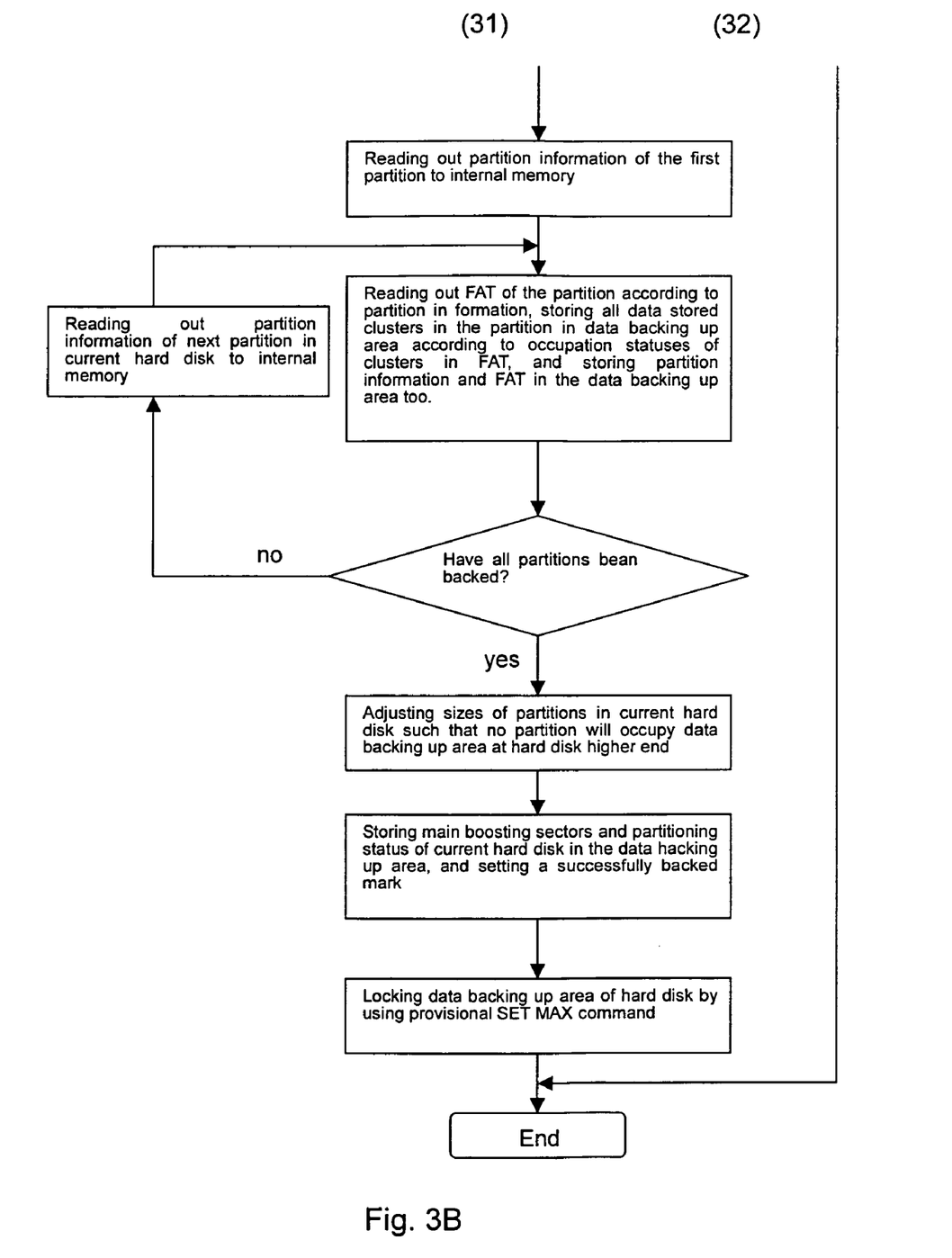

In an embodiment of the data backing up method of the present invention, as shown in FIGS. 3A and 3B, since there may be several hard disks on user's system, the user will be first asked to select a hard disk to be operated during a backing up operation. After a hard disk is selected, since the data of the hard disk may have been backed and locked, it is necessary to unlock it so that all hard disk data can be accessed, so the hard disk volume is set to its practical maximum volume by using the provisional SET MAX command and the locked area in the hard disk is unlocked; then the first logic sector, i.e., the main bootstrap record (MBR) of the hard disk is read out, and information on various partitions in the hard disk can be found based on a partition information table in MBR. The number of the sectors in each partition occupied by data is calculated first based on the FAT of each partition, the sum of these numbers will be the space size needed for backing up all partitions of the hard disk. A number 500 may be added to the sum, to get the space size needed by the data backing up area. The 500 sectors are used as preserved ones for storing controlling information and some useful sectors such as MBR sectors that do not belong to any partition. After the space needed by the data backing up area is calculated, whether the hard disk higher end has enough space to be used as the data backing up area is checked; if the answer is negative, then data backing up operation can not be performed for the hard disk; if the answer is positive, then a data backing up area is partitioned off from the higher end spare space of the hard disk based on calculated volume needed by the data backing up area; after that, data information in various partitions are read out and stored in the data backing up area; at last, the data backing up area is locked to make the backed data to be in protected status.

Figure 6:
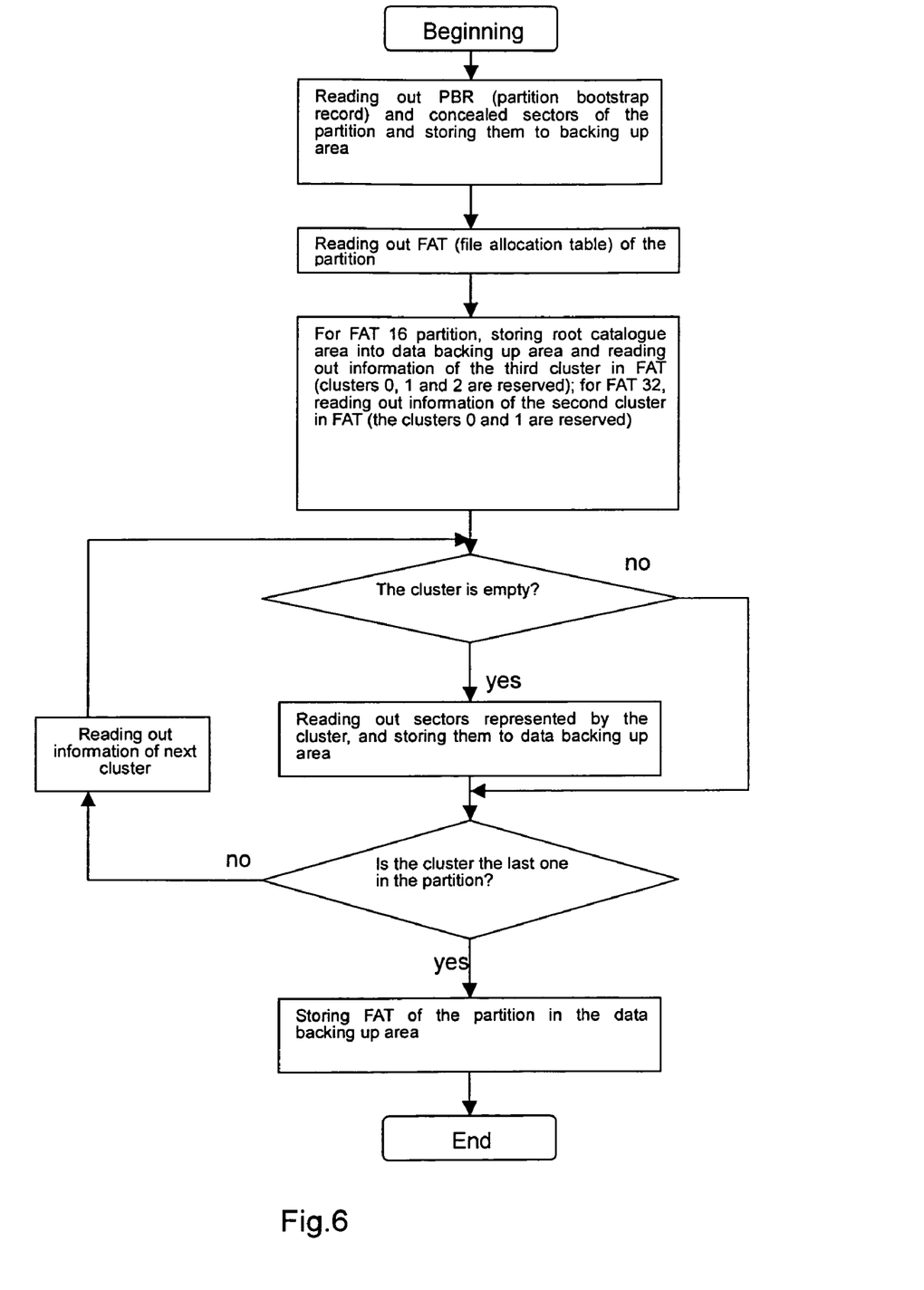
FIG. 6 is a flow chart showing the data backing up of one hard disk partition in an embodiment according to the invention.

FIG. 6 is a detailed flow chart showing the backing up of a partition in the hard disk. During the process, useful data in the partition are read out and backed to the data backing up area, wherein the useful data include: bootstrap record of the partition, FAT of the partition, and the clusters in the data area of the partition in which data has been stored. Whether useful data is stored in a cluster in the data area is determined based on the records in the FAT. In the FAT, the information on the cluster being zero shows the cluster is not occupied and does not need to be stored; while if the information on the cluster is non-zero, then the cluster is read out and stored in the data backing up area.

After all partitions are stored, MBR and controlling information of the backup are stored in the data backing up area too, then the backing up operation is accomplished and a successfully backed mark and a mark "to be locked" are set.

At last the data backing up area is locked by use of provisional SET MAX command. The purpose of locking is to protect the data in the hard disk data backing up area, and the purpose of using provisional SET MAX command is that a system manufacturer can use the hard disk to massively copy hard disks for production after the said backup is successful, while if the backing up area is permanently locked, it would be still in locked state when being taken off by the manufacturer, thus its contents can not be copied. Now since a mark "to be locked" has been set, BIOS will recognize that mark automatically and set the hard disk to a permanently locked state when the hard disk is re-started.

Figure 4A:
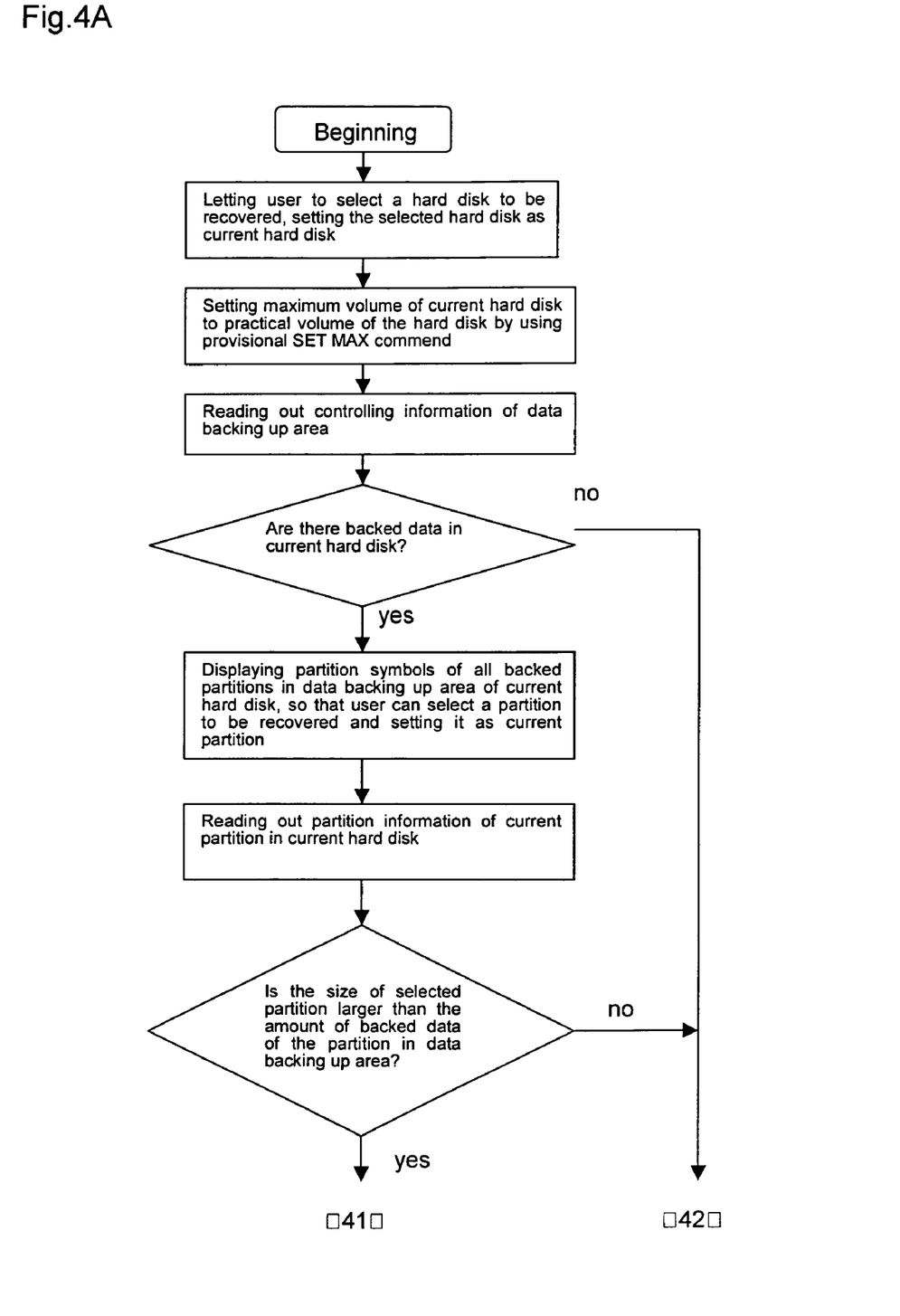
FIGS. 4A and 4B show a flow chart of data recovering of a single hard disk partition in an embodiment according to the invention.
Figure 4B:
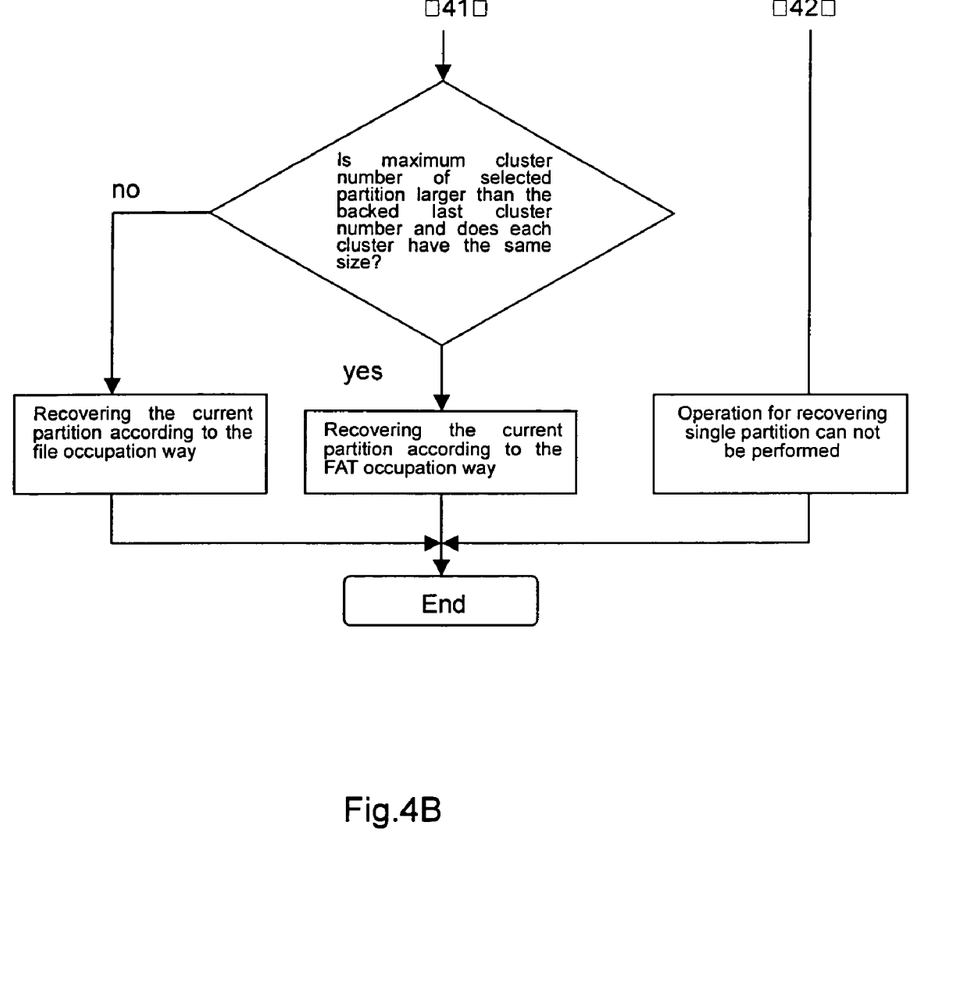
Figure 5:
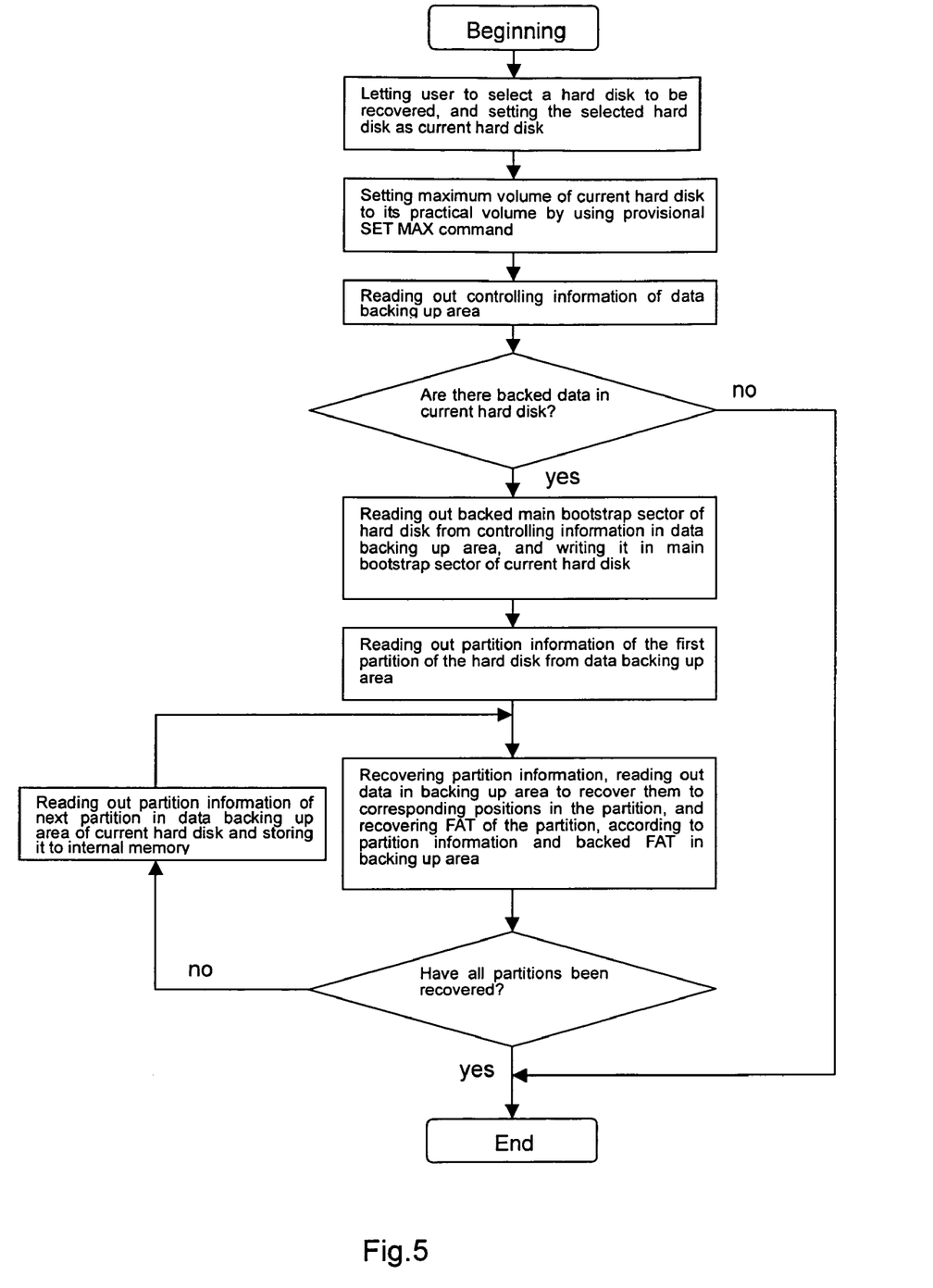
FIG. 5 is a flow chart showing the data recovery of whole hard disk in an embodiment according to the invention.

There are two modes to realize the method of the present invention for recovering the backed data, which can satisfy different demands of the user respectively, namely, the recovery of single hard disk partition and the recovery of all hard disk contents, as shown in FIGS. 4A, 4B and 5.

When the hard disk recovery hot key is pressed by the user during POST (power on self test) process of BIOS, the hard disk recovering operation will be performed, and the user is first asked to select one of the recovery modes. If the mode of recovery of a single hard disk partition is selected, then the selected single partition will be recovered, as shown in FIGS. 4A and 4B, this recovering operation will not impact the hard disk partition status and the contents in other partitions; if the mode of recovery of all hard disk contents is selected, then the hard disk partition status and the contents in various partitions will be recovered back to their original statuses during backing up, as shown in FIG. 5.

For the recovery mode of a single hard disk partition, only a particular partition of the hard disk contents that is backed in the backing up area is recovered, the hard disk partition status will not be changed and the contents in other partitions will not be impacted. Even when the size of the partition has been changed by the user after the backup, the contents in the partition can still be recovered to its backed contents as long as the changed partition size is larger than the backed volume. This recovering method is realized by converting the partition contents into files. In the case where only the sizes of partitions are changed but the sizes of clusters are not changed, the present invention also provides a simple single partition recovering method that does not depend on files.

As shown in FIGS. 4A and 4B, during the single partition recovering operation, the user is first asked to select a hard disk to be operated, then the volume of the hard disk is set to its practical volume by use of the provisional SET MAX command, the controlling information is read out from the data backing up area. If the controlling information is legal and shows that there is backed information in the hard disk, then the following operations will be performed, otherwise the recovery can not be done.

The user is asked to select a partition to be recovered, since the size of the partition may be changed by the user, the current size of the partition is needed to be read out from the hard disk. The current size is compared with the data volume in backed partition to check if the current partition can contain the contents of backed data. If the answer is positive, then the single partition recovering operation is performed, otherwise the operation can not be performed.

There are two ways to perform the single partition recovering operation, one way is based on files and is relatively complicated; another way is based on FAT, its program is easily realized, but there are some requirements, namely, besides the requirement that the current partition can contain the backed data, the structures and the sizes of clusters of current partition should be identical with those of the backed partition. It is determined whether such requirements are met, if the current partition has the same structure and cluster size, then the way based on FAT is performed, otherwise the way based on files is taken.

The further description of the two ways is as follows:

(a) Recovering method with the way based on file occupation

Figure 9A:
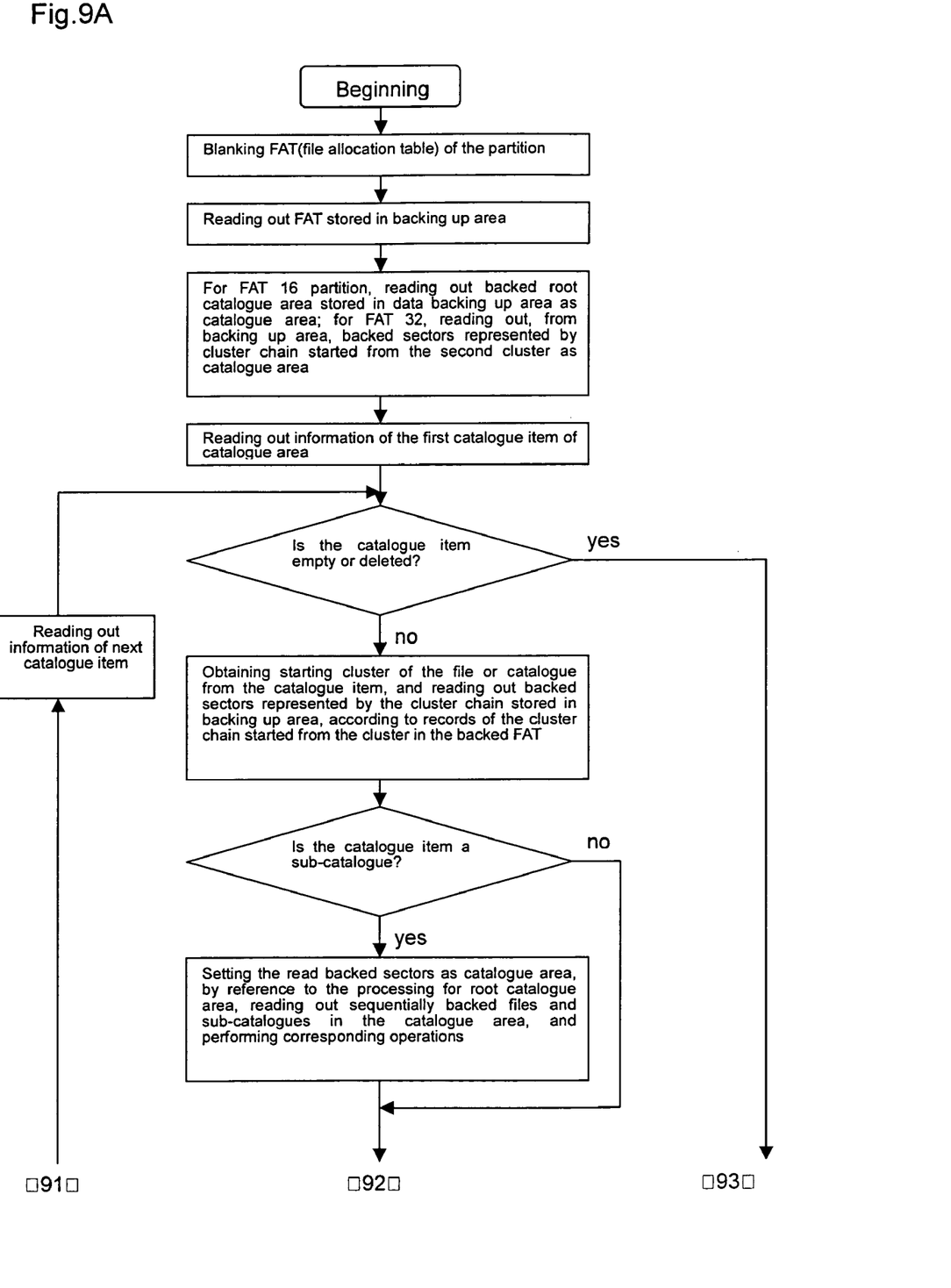
FIGS. 9A and 9B show a flow chart of recovering of data in a single hard disk partition in another embodiment according to the invention.
Figure 9B:
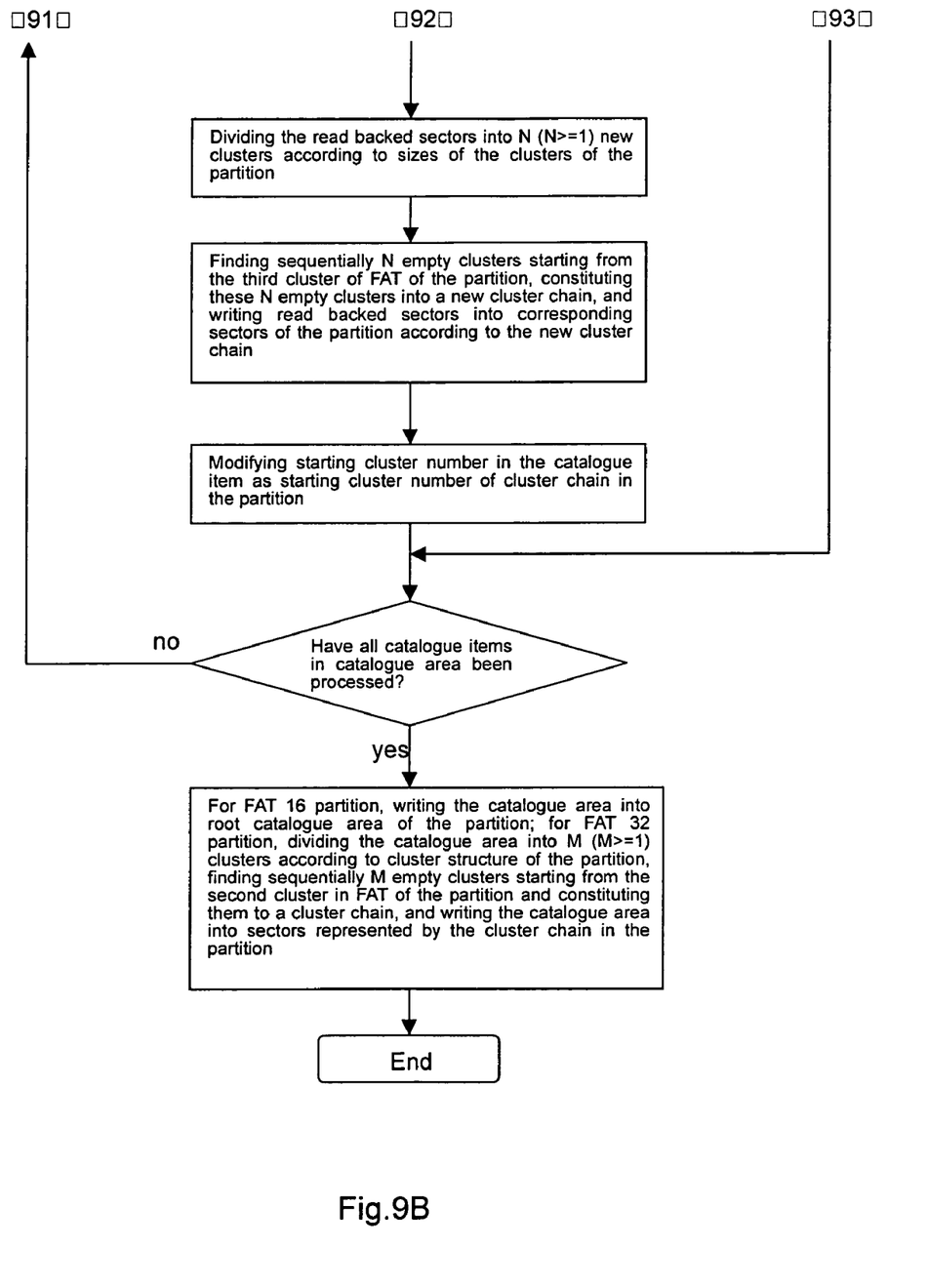

As shown in FIGS. 9A and 9B, beginning from the root catalogue, data in the backing up area are read out sequentially in the manner of files; every backed file is re-divided into several clusters according to the cluster size of the current partition, every file is re-constituted into cluster chains and then stored in the current partition, meanwhile, the file information in the catalogue is modified such that it will point at a correct head cluster in recovered partition. For sub-catalogues, besides the catalogue itself is reconstituted into cluster chain and stored in the partition, various files and sub-catalogues in the catalogue are also reconstituted into cluster chains and stored in the partition. Thus a file system that is same as that during the backup is established in the partition, and the recovery with the way based on files from backup to partition is accomplished.

(b) Recovering method with the way based on FAT occupation

Figure 8:
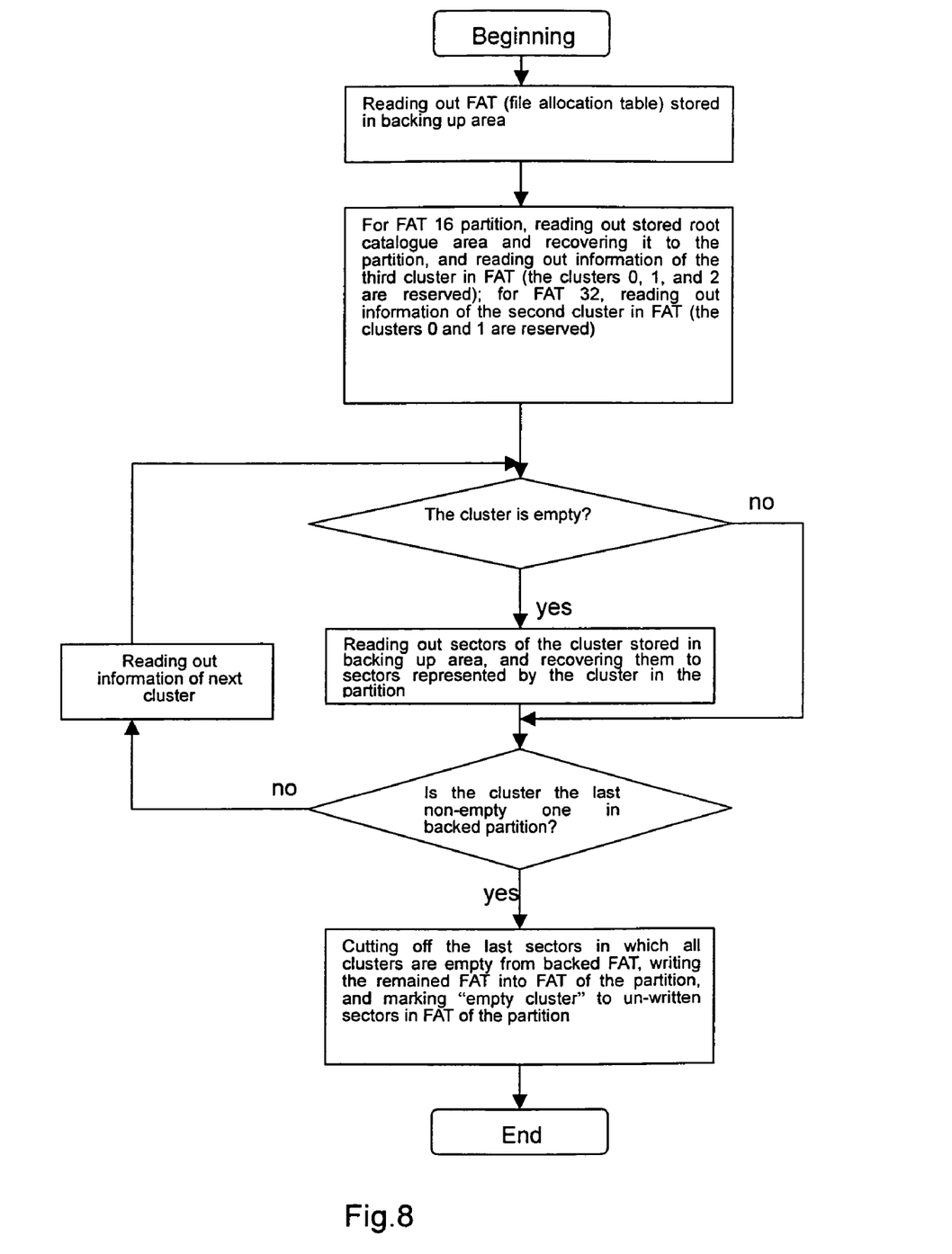
FIG. 8 is a flow chart showing the recovering of data in a single hard disk partition in an embodiment according to the invention.

As shown in FIG. 8, the prerequisite of this method is that both the structures and the sector number in each cluster of the partition to be recovered and the partition during backup are the same, but the size of the two partitions may be different. Since the partition structures and the sizes of clusters are the same, the data in data area can be directly recovered to their status during backup, and since the sizes of partitions are different, the sizes of FATs are different too. Only the cluster occupation status needs to be recovered to the status during backup. So in this method, the used clusters in the partition are recovered to the partition according to the FAT during backup, the cluster occupation status in the backed FAT is recovered to the FAT of the partition, and spare cluster marks are filled in the unused clusters in the FAT of the partition.

Figure 7:
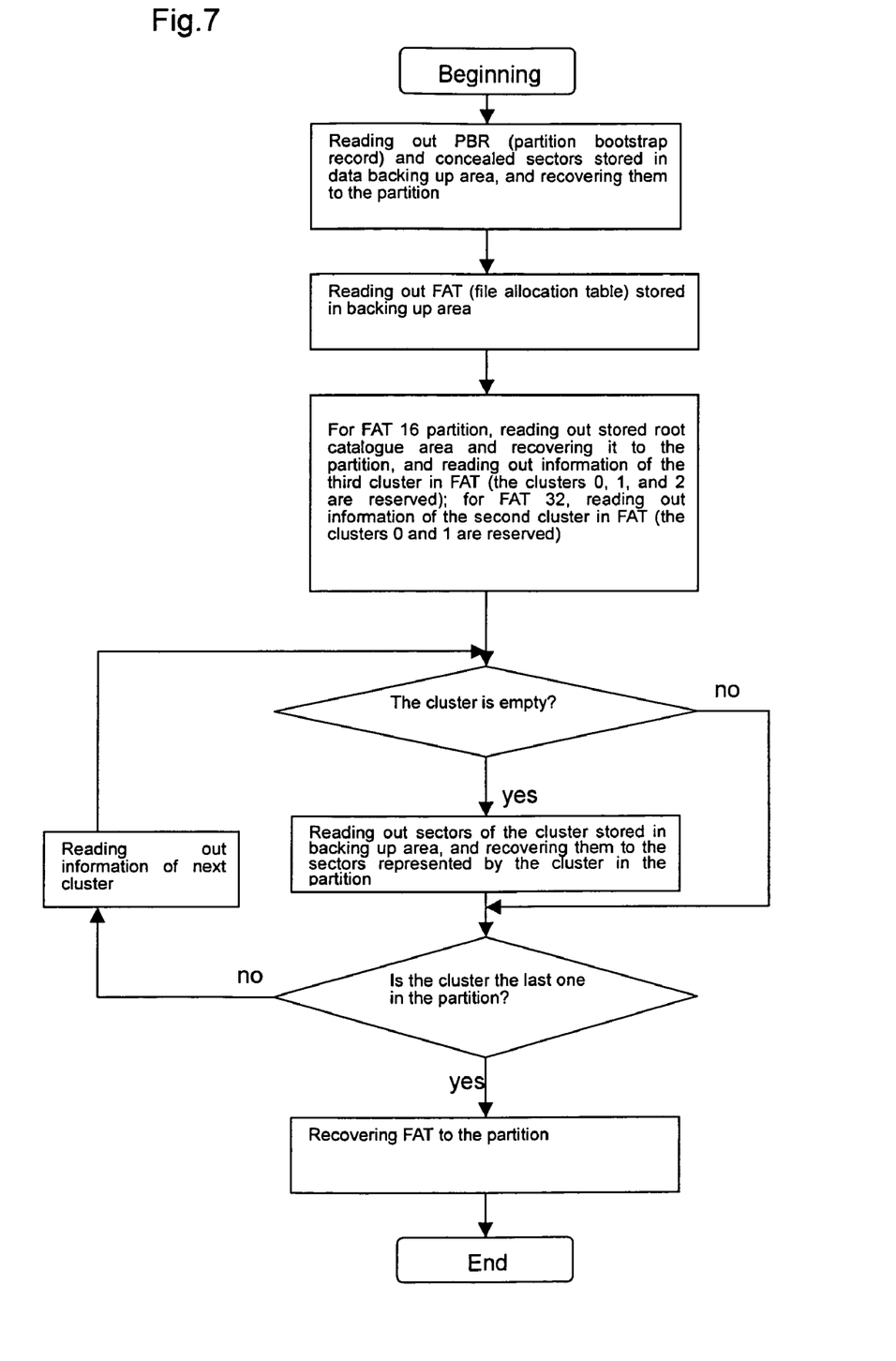
FIG. 7 is a flow chart showing the recovering of one partition during recovering of whole hard disk data in an embodiment.

For the recovery manner of the whole hard disk contents, both the hard disk partition status and the data information in every partition can be recovered back to their original statues during backup, as shown in FIGS. 5 and 7.

In this recovering method, hard disk partition status stored in the hard disk data backing up area is first read out, and the current hard disk partition status is set to the status during backup; then for each partition, the contents of the backing up area in each partition is recovered to a corresponding position of the partition according to the occupation status of the FAT during backup.

The user is first asked to select a hard disk to be operated, the volume of the hard disk is set to its practical volume by use of SET MAX command so that the hard disk data backing up area can be accessed. The controlling information in the data backing up area is read out, if there is no backed data in the current hard disk, then the recovering operation is not performed; while if there are backed data in the hard disk, then the backed first partition, i.e. MBR of the hard disk is read out from the data backing up area, then the hard disk partition status during backup is obtained, and the MBR is recovered to the current hard disk.

According to the partition status during backup, for each partition, its backed basic information, such as PBR, concealed sectors of the partition etc., are read out from the data backing up area and recovered; then the backed FAT of the partition is read out from the data backing up area, and according to the occupation status of the clusters in the FAT, backed clusters in the partition are read out and recovered, the FAT is also recovered. After all the backed partitions are recovered, the whole hard disk is recovered to its status during backup.

The invention claimed is:

1. A method for backing up user data in a hard disk, comprising the steps of:
   (1) Partitioning off at least a segment of hard disk space from the hard disk and setting it as a data backing up area;
   (2) Backing up a partition status of the hard disk and data of at least one partition to be backed into the data backing up area; and
   (3) Locking the data backing up area to prohibit the data backing up area from being accessed by other application software or operation systems.

2. A method according to claim 1, wherein said data backing up area is at an area corresponding to a higher end of logic addresses of the hard disk.

3. A method according to claim 1, wherein said locking and setting of the data backing up area are implemented by setting a hard disk highest address that is lower than a practical highest space address of the hard disk.

4. A method according to claim 3, wherein the hard disk highest address is set by the use of a SET MAX command supported by a hard disk area protection function possessed by the hard disk itself, a higher end area of the hard disk with addresses higher than the hard disk highest address is partitioned off and is used as the data backing up area; and areas of the hard disk with addresses lower than the hard disk highest address are used as user's usable data areas.

5. A method according to claim 1, wherein a size of the data backing up area is determined based on a space practically occupied by the data and information on the hard disk.

6. A method according to claim 1, wherein hard disk data are written into the data backing up area together with controlling information during the data backup, the controlling information includes information on: a size of the data backing up area, a beginning address of the data backing up area, a size of the backed original partition, a number of original partitions, types of the partitions, a size of the hard disk partition table, and a mark indicating whether the data backing area has been locked successfully.

7. A method according to claim 1, wherein the locking of data backing up area has two following manners:
   (1) Permanent locking: after locking, the data backing up area locked at the higher end will not be able to be accessed, even when the hard disk is re-started after power down, the locked data backing up area still could not be accessed; and
   (2) Provisional locking: after locking, the data backing up area locked at the higher end will not be able to be accessed, but when the hard disk is re-started after power down, its locking status will have a value corresponding to the locking status which was last set to the hard disk.

8. A method according to claim 7, wherein said two locking manners correspond to two setting manners of the SET MAX command, namely permanent setting manner and provisional setting manner.

9. A method according to claim 7, wherein a mark indicating the locking status is stored in the data backing up area during the backup, and is set as a mark to be locked or a successfully locked mark, indicating accomplished provisional locking or permanent locking respectively.

10. A method according to claim 9, wherein when the hard disk is started, if said mark is a mark to be locked, then a permanent locking operation is performed to the hard disk, and after successful locking, the mark will be set as a successfully locked mark.

11. A method according to claim 1, wherein said backing up data into the data backing up area comprises the steps of:
   (1) Reading out a main bootstrap record of the hard disk;
   (2) Finding out information on each partition according to a hard disk partition information table in the main bootstrap record;
   (3) Calculating a data volume in each partition according to a FAT of each partition, calculating a volume required for backing up a partition, and partitioning off a data backing up area from a spare higher end space in the hard disk;
   (4) Storing the FAT in each partition and the boosting record sector in the data backing up area; and
   (5) For each partition, storing used clusters in a data area of the partition to the data backing up area according to an occupation status of the FAT.

12. A method for recovering data backed and locked in a hard disk from a data backing up area to a partition that is accessible based on operation system, comprising the steps of:
   (1) Unlocking the data backing up area; and
   (2) Recovering data in the data backing up area to corresponding hard disk partitions according to controlling information stored in the data backing up area, wherein this step includes:
      (a) Step of recovering a single hard disk partition, which recovers the data of a certain partition in the hard disk contents backed in the data backing up area; or
      (b) Step of recovering the whole hard disk, which recovers the partition status of the hard disk to the status during backup, and recovers the data information in the data backing up area to each corresponding hard disk partition;
   Wherein said step of recovering a single hard disk partition or step of recovering the whole hard disk is selected by a user to be performed.

13. A method according to claim 12, wherein said data backing up area is locked by setting highest address of the hard disk that is lower than the practical highest space address of the hard disk; said unlocking step is accomplished by setting the highest address as the practical highest space address of the hard disk, so that the data backing up area is accessible.

14. A method according to claim 12, wherein the step of recovering a single hard disk partition includes the following steps:
   Starting from a root catalogue, reading out sequentially data in the data backing up area in file manner, re-dividing the backup of every file into several clusters according to a cluster size of the current partition, re-constituting a cluster chain for every file and storing the cluster chains into the current partition, and modifying the file information in the catalogue such that it will point at a correct head cluster in the recovered partition; for sub-catalogues, in addition to reconstituting cluster chains for the catalogue itself and storing them into the partition, also reconstituting cluster chains for individual files in its catalogue and sub-catalogues and storing them into the partition.

15. A method according to claim 12, wherein the step of recovering a single hard disk partition includes:

When both the structures and the sector number of each cluster in the partition to be recovered and the partition during backup are the same, recovering the used clusters in the backed partition to the partition according to the FAT during backup, recovering the cluster occupation status of the backed FAT into the FAT of the partition, and filling other unused clusters information in FAT of the partition into empty cluster marks.

16. A method according to claim 12, wherein at first the hard disk partition status stored in the data backing up area is read out, and the current hard disk partition status is set to the status during backup, then for every partition, the contents of each partition in the backing up area are recovered to corresponding position of the partition according to the occupation status of FAT during backup.

17. A method according to claim 1, wherein a computer program for controlling the execution of the steps of said method is incorporated in a system BIOS program in the computer, the program is executed when the computer is started.

18. A method according to claim 1, wherein a hot key used to start the execution of said method is set on the computer keyboard, and when the hot key is pressed, the computer will execute the steps of said method.

19. A method according to claim 12, wherein a computer program for controlling the execution of the steps of said method is incorporated in a system BIOS program in the computer, the program is executed when the computer is started.

20. A method according to claim 12, wherein a hot key used to start the execution of said method is set on the computer keyboard, and when the hot key is pressed, the computer will execute the steps of said method.

* * * * *